United States Patent
Kim et al.

(10) Patent No.: US 8,320,706 B2
(45) Date of Patent: Nov. 27, 2012

(54) METHOD FOR GEOTAGGING OF PICTURES AND APPARATUS THEREOF

(75) Inventors: Ig Jae Kim, Seoul (KR); Hyoung Gon Kim, Seoul (KR); Sang Chul Ahn, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 742 days.

(21) Appl. No.: 12/483,103

(22) Filed: Jun. 11, 2009

(65) Prior Publication Data

US 2010/0141795 A1    Jun. 10, 2010

(30) Foreign Application Priority Data

Dec. 9, 2008 (KR) ........................ 10-2008-0124513

(51) Int. Cl.
*H04N 5/76* (2006.01)
(52) U.S. Cl. ..................................... 382/276; 348/231.3
(58) Field of Classification Search .................. 382/276; 348/231.3
See application file for complete search history.

(56) References Cited

U.S. PATENT DOCUMENTS

| 7,353,114 B1 * | 4/2008 | Rohlf et al. ........................ 702/5 |
| 2007/0031062 A1 * | 2/2007 | Pal et al. ........................ 382/284 |
| 2007/0110338 A1 * | 5/2007 | Snavely et al. ............... 382/305 |

FOREIGN PATENT DOCUMENTS

| JP | 2003-244488 | 8/2003 |
| JP | 2004-032373 | 1/2004 |
| JP | 2006-277169 | 10/2006 |
| JP | 2007-114942 | 5/2007 |

* cited by examiner

*Primary Examiner* — Stephen R Koziol
(74) *Attorney, Agent, or Firm* — Fenwick & West LLP (57) ABSTRACT

Provided are a method and an apparatus for tagging a photograph with information. The method of tagging a photograph with information, which calculates a shooting position of an input image from reference images having shooting position information to tag the shooting position information, includes: selecting a plurality of reference images; calculating a relative shooting position of the input image to the shooting positions of the reference images; calculating the shooting position of the input image on the basis of the calculation result of the calculating; and storing the shooting position and shooting direction information on the input image in an exchangeable image file format (EXIF) tag of the input image.

9 Claims, 8 Drawing Sheets

METHOD FOR GEOTAGGING OF PICTURES AND APPARATUS THEREOF

CROSS-REFERENCE TO RELATED APPLICATION

This application claims priority to Republic of Korea Patent Application No. 10-2008-0124513, filed on Dec. 9, 2008, and all the benefits accruing therefrom under 35 U.S.C. §119(a), the contents of which in its entirety are herein incorporated by reference.

BACKGROUND

1. Field

This disclosure relates to a method and apparatus for geotagging of a photograph, and more particularly, to a method and apparatus for tagging a photograph taken with a digital camera without a global positioning system (GPS) function or with a general film camera and uploaded on a website, with GPS information and a direction in which an object is photographed, in which two reference images tagged with GPS information are searched for, relative positions and directions between the images and an input image are obtained through image processing, and GPS information and direction information on the input image are determined and tagged by using the GPS information on the reference images.

2. Description of the Related Art

Recently, with the development of Internet technology and digital devices, many people upload and share photographs taken by using cameras in Internet photo sharing sites or their blogs. In addition, as map information services have been actively provided in recent years, methods of uploading photos in association with maps have spread gradually.

At this point, as the Internet service companies allow users to input information associated with shooting position in addition to simple upload of the photos in the Internet, the companies try to extend a new service area. The process of inputting position information is called geotagging.

By applying the tag information having the position information, travel information such as photos taken in advance by other people at real positions on a map can be obtained. As such, various types of information can be acquired. In addition, as leading Internet service companies provide photo services associated with positions, the interest in geotagging has increased.

In addition, a method of utilizing global positioning system (GPS) data for geotagging has started to spread, but it is still in the initial stage. In most cases, photos taken by people are manually tagged one by one through a comparison with a map.

As digital cameras are widespread, general users easily take photographs and upload their photos on the Internet blogs and photo sharing sites. When the photos are uploaded on a web album, the photos are arranged in time order, and the information such as a type of camera is displayed. This can be achieved because exchangeable image file format (EXIF) tag information is automatically stored in a photo header file when a photograph is taken with the camera.

Recently, cameras cooperative with the GPS as the geotagging method have started to spread, and attempts to store position information in the EXIF tag have been made. The GPS camera will additionally use a magnetic field sensor such as a digital compass in order to provide accurate information on a position and a viewpoint, that is, a direction of the camera at the time of taking a photograph.

The applicability of the photograph tagged with the position information including the direction information is great. There are advantages in that travel information can be directly checked on a map, and 3-dimensional (3D) reconstruction of an object from the acquired photos can be achieved with the position information on the camera. In order to apply these advantages, this kind of service has been competitively proposed to the Internet service companies.

However, as described above, since the cameras cooperative with the GPS are not common yet, it is not easy to provide the position and direction information to the existing photographs. Accordingly, a technique of tagging the existing photograph that does not include GPS information with position and direction information through image processing is required.

SUMMARY

The disclosure provides a method and apparatus for automatically tagging an existing photograph which does not include shooting position and direction information with shooting position information (latitude and longitude coordinates) and direction information.

In one aspect, there is provided a tagging method including: selecting a plurality of reference images; calculating a relative shooting position of an input image to the shooting positions of the reference images; calculating the shooting position of the input image on the basis of the calculation result of the calculating; and storing the shooting position and shooting direction information on the input image in an exchangeable image file format (EXIF) tag of the input image.

In another aspect, there is provided a tagging apparatus including: an intrinsic parameter extractor extracting an intrinsic parameter; a feature vector extractor for extracting a feature vector from the feature points of reference images and an input image; a matrix and vector extractor for extracting the rotation matrix and the translation vector from the intrinsic parameter and the feature vector; a calculator for calculating the shooting position and shooting direction of the input image by using the rotation matrix and the translation vector; and a tagging unit for recording the calculated position and direction information in the EXIF tag of the input image.

Accordingly, the information tagging method and apparatus according to the embodiment can easily input and store shooting position and direction information in an image which does not store position and direction tag information, and a user does not need to input information. As a result, photographs can be tagged with the position and direction information accurately and simply.

BRIEF DESCRIPTION OF THE DRAWINGS

The above and other aspects, features and advantages of the disclosed exemplary embodiments will be more apparent from the following detailed description taken in conjunction with the accompanying drawings.

DETAILED DESCRIPTION

Exemplary embodiments now will be described more fully hereinafter with reference to the accompanying drawings, in which exemplary embodiments are shown. This disclosure may, however, be embodied in many different forms and should not be construed as limited to the exemplary embodiments set forth therein. Rather, these exemplary embodiments are provided so that this disclosure will be thorough and complete, and will fully convey the scope of this disclosure to those skilled in the art. In the description, details of well-known features and techniques may be omitted to avoid unnecessarily obscuring the presented embodiments.

The terminology used herein is for the purpose of describing particular embodiments only and is not intended to be limiting of this disclosure. As used herein, the singular forms "a", "an" and "the" are intended to include the plural forms as well, unless the context clearly indicates otherwise. Furthermore, the use of the terms a, an, etc. does not denote a limitation of quantity, but rather denotes the presence of at least one of the referenced item. It will be further understood that the terms "comprises" and/or "comprising", or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

In the drawings, like reference numerals in the drawings denote like elements. The shape, size and regions, and the like, of the drawing may be exaggerated for clarity.

Figure 1:
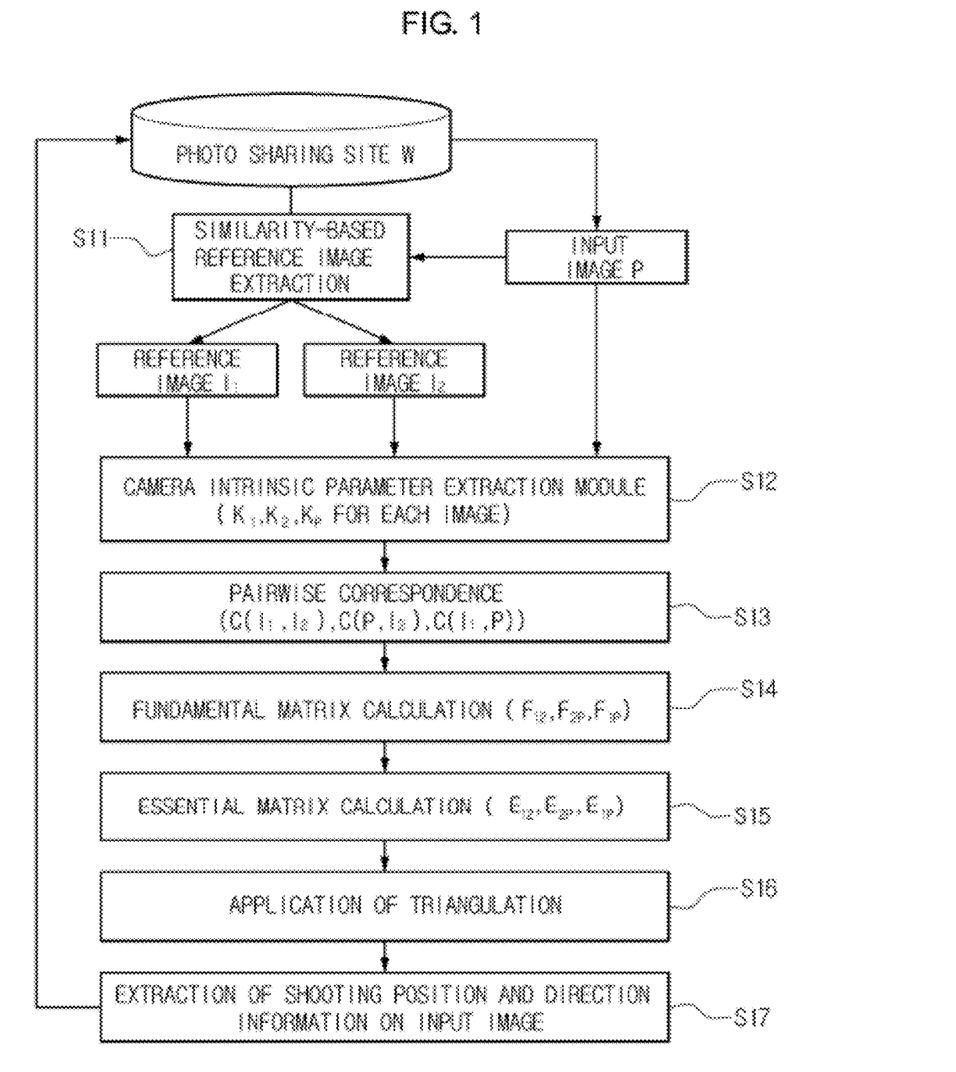
FIG. 1 is a flowchart of the entire system of a method of tagging a photograph with position and direction information according to an embodiment.

FIG. 1 is a flowchart of the entire system of a method of tagging a photograph with position and direction information according to an embodiment. Picture candidates are selected from a server or a database of a photo sharing site W including photo data.

In a similarity-based reference image extraction S11, from among the pictures existing in the aforementioned server or the photo database of the photo sharing site W, only the pictures having position information are considered as a target. The picture candidates having the position information are searched for target candidates by inputting a description keyword representing a position similar to an input image P of a user. When the keyword information is insufficient, only a visual descriptor comparison is performed.

By extracting robust visual descriptors from the searched candidate photo images using an algorithm such as scale-invariant feature transform (SIFT), visual similarities are compared. Through the similarity comparison, the two photo images having the highest similarity are selected. Alternatively, the user may manually input two photographs of the same object. The two input photographs serve as reference images $I_1$, $I_2$, and when position information is not stored in an exchangeable image file format (EXIF) tag of the reference image, the user will have to directly store the position information therein. Since the object in the input image P and the object in the reference images $I_1$, $I_2$ are the same, there is no need to determine similarity.

As such, the method of selecting the reference images $I_1$, $I_2$ is not limited to specific methods, but may be varied depending on ranges or applications.

Next, a camera intrinsic parameter extraction S12 for the reference images $I_1$, $I_2$ and the input photo image P is performed. In this process S12, intrinsic parameters of a camera are extracted. From the extraction result, data such as a focal length converted into a pixel unit of the camera can be obtained.

In general, extracting an intrinsic parameter from a single photograph is not possible. However, in the embodiment, EXIF tag information, which enables extraction of camera intrinsic parameters from only a single photograph, is utilized. Nowadays, any kind of digital camera can automatically create EXIF tags when taking photos, and from the information, a type of the camera and a focal length can be obtained. The intrinsic parameter can be derived from the values.

The intrinsic parameter includes the camera focal length and lens anamorphic degrees. Since the recent camera lenses have little anamorphic degrees, this can be processed as a value of approximately 0 and can be ignored. But, the camera focal length is a very important factor. The camera focal length can be obtained from the image acquired in advance.

From the EXIF tag included in the photo, a resolution of the image, a type of the camera, and the focal length can be obtained. However, the focal length included in the EXIF tag is not represented as a pixel value. Therefore, in order to convert the focal length into the pixel value, CCD effective pixel information is needed. For this, by using the information on the camera type included in the EXIF tag, a camera focal length of a desired pixel value can be calculated. Consequently, the intrinsic parameter can be extracted from the EXIF tag.

Next, matching S13 of two images as a pair on the basis of the extracted feature point is performed. By matching each pair of images, matching points therebetween are obtained. By obtaining common matching points of both of the reference images $I_1$, $I_2$ and the input image P, more accurate matching points can be obtained. However, there is a limitation in that a number of photos having many common areas are needed in order to obtain the points, so that applying this for general use is difficult.

In the embodiment, applied is a method of calculating a rotation matrix and a translation vector which represent a relationship only between each pair of photos, so that common feature points of each pair of photos alone are enough for the method. Accordingly, the limitation that a number of common areas of all target photo images are needed can be overcome.

Figure 2:
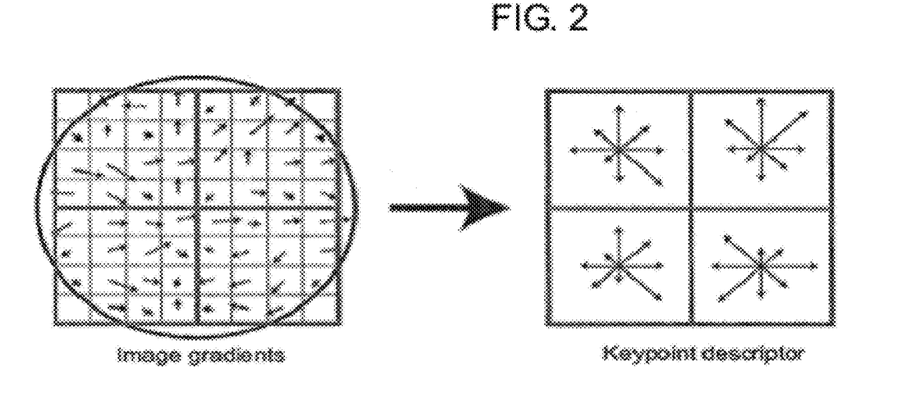
FIG. 2 illustrates a method of finding feature points according to the embodiment.

FIG. 2 is a diagram showing the process S13 of obtaining the matching points of FIG. 1. When SIFT is used to extract feature points, a number of feature points can be extracted from an image. In this case, on the basis of a position extracted as the feature point, 8×8 pixels are selected, (a center of a left picture is the position of the feature point), and gradients of each pixel can be represented as arrows. Thereafter, when a histogram accumulation is performed on the arrows of each quadrant of the left picture, a right picture is obtained. This corresponds to a visual descriptor (VD). When a VD of each feature point is determined, a difference between histograms per each feature point is calculated, and the feature point having the minimum difference is determined as the matching feature point. The matching feature point is used as a component of a feature vector that will be used for calculating a fundamental matrix and an essential matrix, which will be described later.

Next, referring back to FIG. 1, calculating S14, S15 of the fundamental matrix and the essential matrix is performed. The fundamental matrix and the essential matrix between each reference image $I_1$, $I_2$ and the input image P are calculated. Through an 8-point algorithm, the fundamental matrix that satisfies the following condition can be calculated S14.

$$x_i F_{ip} x_p = 0 \qquad \text{[Equation 1]}$$

where $x_i$ and $x_p$ are feature vectors extracted from the reference image $I_i$ and the input image P. Similarly, the relation between the reference image $I_j$ and the input image P and the fundamental matrix between the reference images $I_i$ and $I_j$ can also be derived by using Equation 1.

The essential matrices $E_{ip}$, $E_{jp}$, and $E_{ij}$ are derived S15 from the calculated fundamental matrices $F_{ip}$, $F_{jp}$, and $F_{ij}$ through Equation 2 as follows.

$$E_{ip} = K_i F_{ip} K_p \qquad \text{[Equation 2]}$$

where $K_i$ and $K_p$ are the intrinsic parameters of the camera which are extracted from the reference image $I_i$ and the input image P. The rotation matrix R and the translation vector t between images can be calculated from the derived essential matrices $E_{ip}$, $E_{jp}$, and $E_{ij}$.

Now, the process of calculating the rotation matrix R and the translation vector t will be described.

By multiplying the fundamental matrix by the matrices $K_i$, $K_p$, the essential matrix is calculated. The rotation matrix R and the translation vector t can be calculated from the calculated essential matrix.

The essential matrix E can be expressed as follows.

$$E = U \Sigma V^T \qquad \text{[Equation 3]}$$

where U and V are 3×3 orthogonal matrices, and $\Sigma$ is a 3×3 diagonal matrix.

$$\Sigma = \begin{bmatrix} S & 0 & 0 \\ 0 & S & 0 \\ 0 & 0 & 0 \end{bmatrix} \qquad \text{[Equation 4]}$$

The determinant of the diagonal matrix $\Sigma$ becomes a singular value of the matrix E.

$$W = \begin{bmatrix} 0 & -1 & 0 \\ 1 & 0 & 0 \\ 0 & 0 & 1 \end{bmatrix} \qquad \text{[Equation 5]}$$

When a matrix W is defined as shown above, the vector t and the matrix R to be obtained are as follows.

$$[t]_x = V W \Sigma W^T \qquad \text{[Equation 6]}$$

$$R = U W^{-1} V^T \qquad \text{[Equation 7]}$$

Here, the matrix $[t]_x$ is as follows.

$$[t]_x = \begin{bmatrix} 0 & -a_3 & a_2 \\ a_3 & 0 & -a_1 \\ -a_2 & a_1 & 0 \end{bmatrix} \qquad \text{[Equation 8]}$$

Next, a process S16 of applying triangulation is performed. In this process S16, a point where straight lines intersect in a 3-dimensional (3D) space is calculated from the translation vectors $t_1$ and $t_3$ obtained in the preceding process, thereby calculating a position where the input photograph P is shot relative to the reference images. In this case, calculation of the straight lines which are exactly aligned is possible only theoretically. Therefore, the calculation is performed by finding the most practically approximate points using the method of least squares.

However, a scale ambiguity problem occurs in the extracted rotation matrix R and the translation vector t. Since the actual distance of the reference image is known, the problem is solved by performing normalization with respect to the value.

The shooting position of the input image relative to the reference images can be estimated from the extracted rotation matrix R and the translation vector t.

Figure 3:
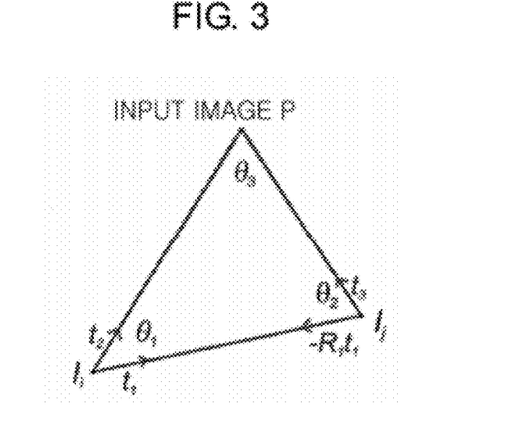
FIG. 3 illustrates a relative shooting position of an input image according to the embodiment.

FIG. 3 is a view illustrating a process of determining the relative position of the process (S16) in FIG. 1. A position of another reference image $I_j$ is determined by using a rotation matrix $R_1$ and a translation vector $t_1$ with respect to the reference image $I_i$ of FIG. 3. In addition, a position of the input image P is determined by using a rotation matrix $R_3$ and a translation vector $t_3$ with respect to the reference image $I_j$. As described above, the relative shooting position of the input image P can be estimated by triangulation.

Next, referring back to FIG. 1, a process S17 of extracting the shooting position and direction information on the input image is performed. The relative position can be represented as absolute latitude and longitude from the reference images having actual latitude and longitude coordinate data [global positioning system (GPS) data]. In addition, since the rotation matrix value is calculated, the direction in addition to the position where the picture is taken is calculated. Therefore, without additional apparatuses such as a GPS device or a digital compass, the latitude and longitude coordinates and the shooting direction information of the input image can be extracted.

A method of determining the absolute position and direction is described as follows. The two reference images include the GPS information. Accordingly, since the relative position of the single input image is calculated from the two reference images by triangulation, the absolute positions (the latitude and longitude coordinates) of the reference images can be easily calculated by the law of sines.

Figure 4A:
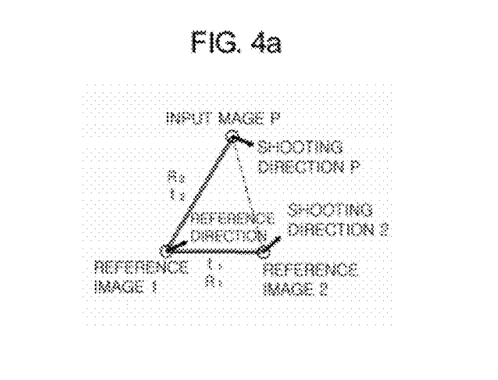
FIGS. 4a and 4b are views illustrating an operation of estimating an absolute shooting position of the input image according to the embodiment.
Figure 4B:
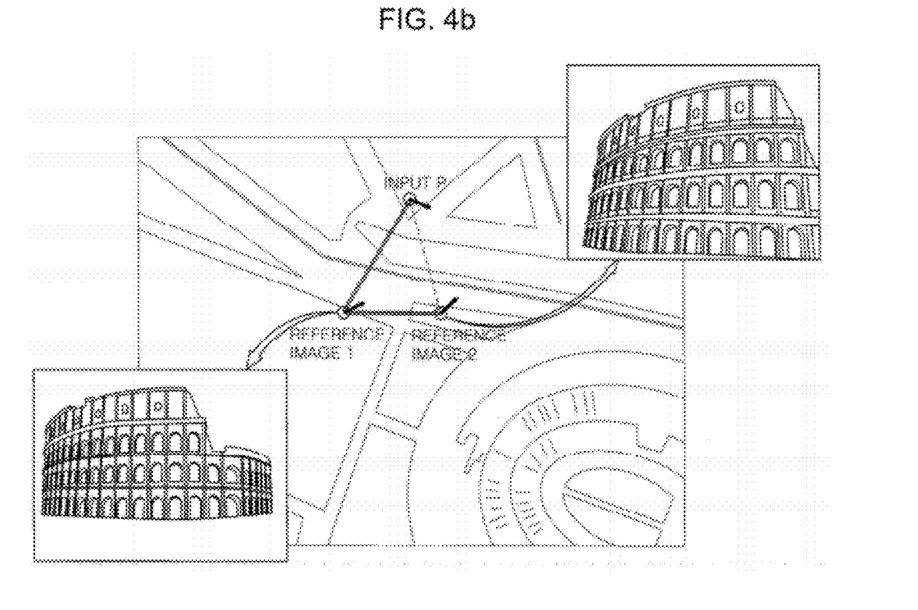

FIGS. 4a and 4b are views illustrating a process (S17) of obtaining the shooting position and direction of the input image in FIG. 1. The result of triangulation is exemplified in FIG. 4a. Coordinates of a reference image 1 form a reference point in a reference coordinate system. In addition, a reference direction is formed as an arbitrary direction on the coordinates of the reference image 1. Since the rotation matrix $R_1$ and the translation vector $t_1$ of a reference image 2 with respect to the reference image 1 are known, the shooting position and direction can be indicated after the translation by the translation vector $t_1$ and the rotation by the rotation matrix $R_1$.

Similarly, the shooting direction of the input image P can be indicated from the rotation matrix $R_2$ with respect to the reference image 1, and a triangle is formed by the translation of the translation vector $t_2$. FIG. 4b shows a result of positioning the formed triangle on the real map by scale matching with the GPS coordinates of the reference images. For the alignment with the reference coordinates, the triangle of FIG. 4a can be rotated, and when the rotation is needed, the quantity of the rotation of the triangle is added to the shooting direction obtained with reference to FIG. 4a to obtain the final shooting direction.

When all the photographs in the candidate area are input through the operations, the position information is automatically calculated, and the information can be stored as a metadata of the photograph such as an EXIF tag.

The information can be applied very usefully by position-based services, personal blogs, and photo sharing sites. In addition, without precision devices such as GPS sensor, by selecting reference images for the photographs available in the Internet, the shooting position and direction information can be automatically obtained. In the case where a software engine is included as a plug-in form in existing photo sharing sites, when the user uploads a photograph, information on the actual shooting position and direction can automatically be displayed.

Figure 5:
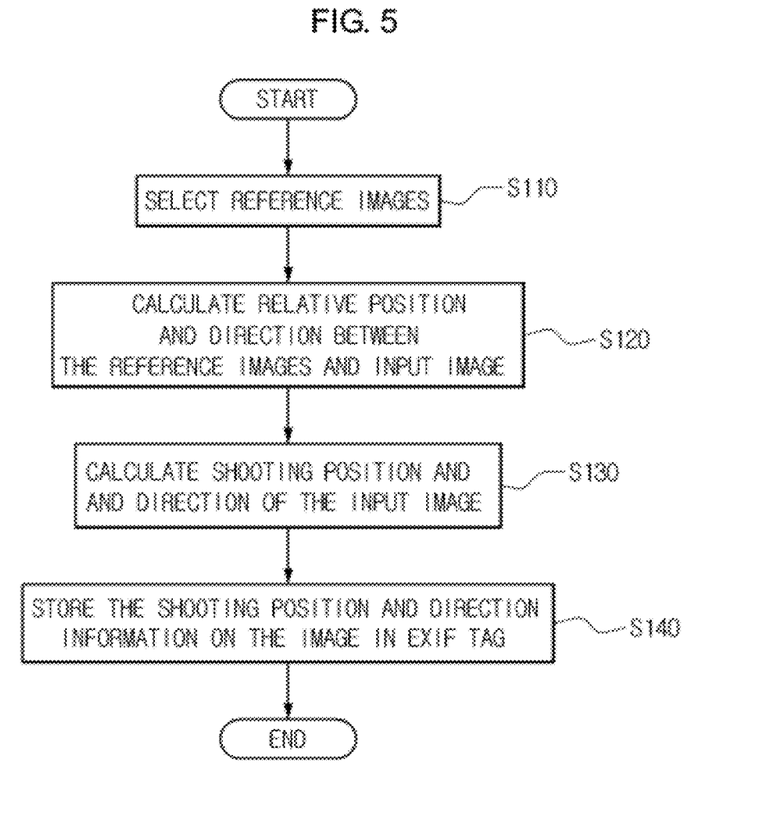
FIG. 5 is a flowchart of a method of tagging a photograph with information according to the embodiment.

FIG. 5 illustrates a method of tagging a photograph with information according to the embodiment. The information tagging method according to the embodiment includes: a process S110 of selecting a plurality of reference images; a process S120 of calculating a relative shooting position of the input image with respect to the shooting position of the reference images; a process S130 of calculating the shooting position of the input image by using the calculation result in the preceding process; and a process S140 of storing the shooting position and shooting direction information on the input image in the EXIF tag of the input image. Here, the input image is in devoid of the shooting position or the direction information recorded in the EXIF tag.

In the process S110 of selecting the plurality of reference images from the database storing photos, as described above, by using the SIFT and the like, an image having a high similarity can be selected from a storage device storing a number of images such as Internet sharing servers or databases and user's computer storage devices.

In the process S120 of calculating the relative shooting position of the input image to the shooting position of the reference image, by using the rotation matrix and the translation vector between the reference image and the input image and the GPS coordinates of the reference image, the relative position and direction can be calculated. Since the input image does not include GPS coordinate information, in order to obtain the shooting position and direction of the input image, the relative position and direction to the reference image have to be obtained.

Figure 6:
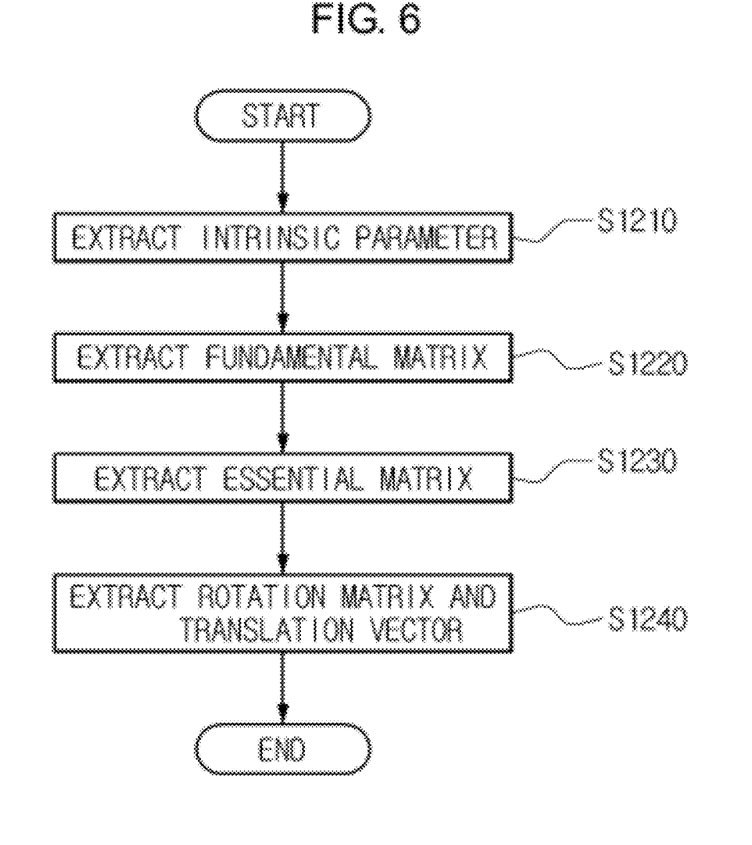
FIG. 6 is a flowchart of a method of extracting a rotation matrix and a translation vector according to the embodiment.

FIG. 6 is a flow chart illustrating the process S120 of calculating the relative shooting position of the input image to the shooting position of the reference image in FIG. 5. The relative position and direction can be obtained by calculating S1240 the rotation matrix and the translation vector. The rotation matrix and the translation vector can be derived from the fundamental matrix and the essential matrix. First, intrinsic parameters of a camera are extracted S1210. From the intrinsic parameters, the fundamental matrix and the essential matrix can be derived. The fundamental matrix can be calculated S1220 by using the feature vector as in Equation 1. When the fundamental matrix is obtained using Equation 1, the essential matrix can be calculated S1230 using Equation 2.

When the rotation matrix and the translation vector between the images are calculated S1240 through the processes described above, the relative position and direction to the reference image can be acquired.

Referring back to FIG. 5, in the process S130 of calculating the shooting position and direction of the input image using the calculation result in the preceding process, the latitude and longitude coordinates and the shooting direction on the real map are calculated. Since the rotation matrix R and the translation vector t are obtained in advance, the position on the real map can be derived by obtaining the coordinates of the two reference images and the input image in the coordinate system.

Figure 7:
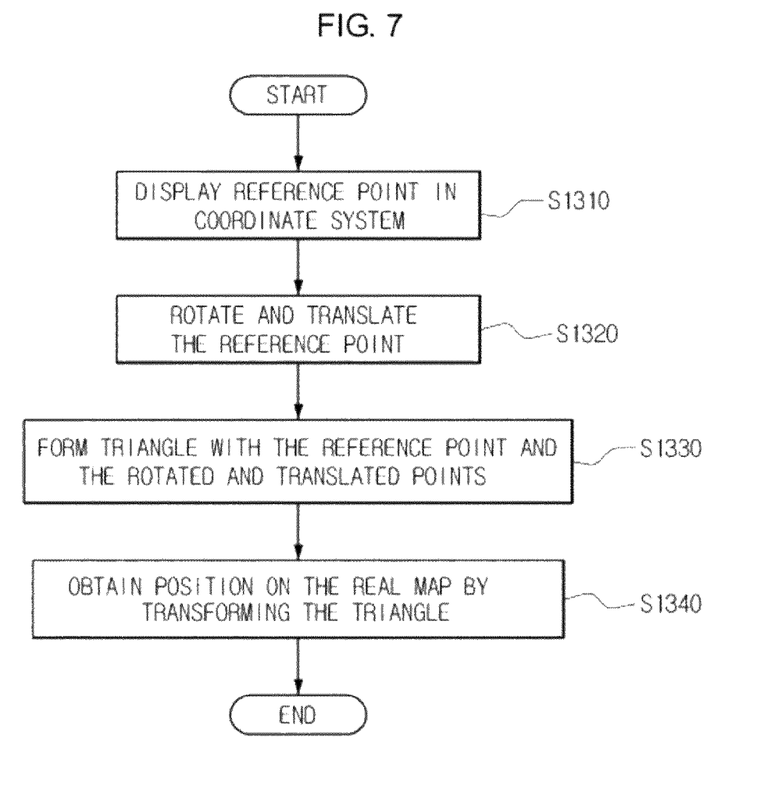
FIG. 7 is a flowchart of a method of obtaining the shooting position of the input image according to the embodiment.

FIG. 7 is a flow chart illustrating the process of calculating the shooting position of the input image of the process S130 in FIG. 5. First, the reference image $I_i$ is designated S1310 as a reference point in the coordinate system. Using the rotation matrix $R_1$ and the translation vector $t_1$ between the $I_i$ and the $I_j$, a reference point is rotated and translated S1320. Next, forming S1330 triangle with the reference point and the rotated and translated points and obtaining S1340 position on the real map by transforming the triangle, the shooting position of the reference image $I_j$ can be obtained. In addition, in the same way, by using the rotation matrix $R_2$ and the translation vector $t_2$ between the $I_i$ and the input image P, the shooting position of the input image P can be obtained.

Figure 8:
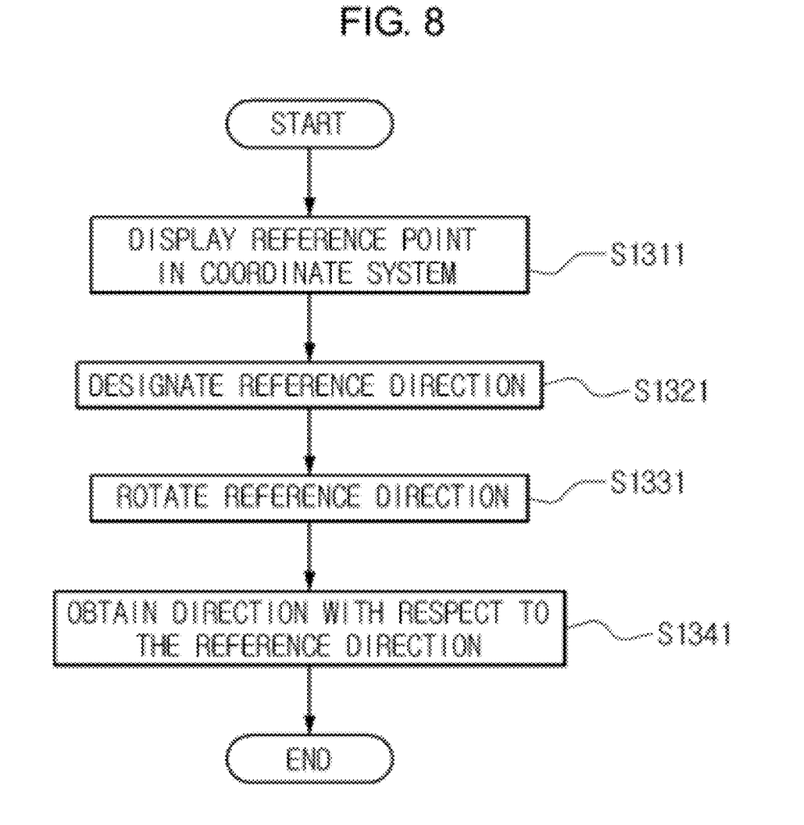
FIG. 8 is a flowchart of a method of obtaining the shooting direction of the input image according to the embodiment.

FIG. 8 is a flow chart illustrating the process of calculating the shooting direction of the input image of the process S130 in FIG. 5. First, the reference image $I_i$ is designated S1311 as a reference point in the coordinate system and an arbitrary direction of the reference image $I_i$ is designated S1321 as a reference direction. Next, by using the rotation matrix and the translation vector, the reference direction is rotated S1331. In this way, the direction of each image with respect to the reference direction can be obtained S1341.

Referring back to FIG. 5, in the process S140 of storing the shooting position and direction information on the input image in the EXIF tag of the input image, the direction information is stored in an undefined area or an unused area of the EXIF tags of the reference image and the input image, and the GPS information is stored in a GPS information area of the EXIF tag of the input image.

Figure 9:
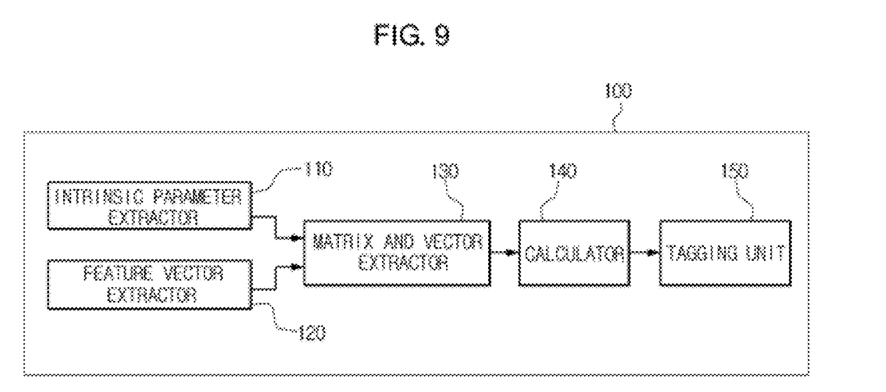
FIG. 9 is a block diagram of an apparatus for tagging a photo with information according to the embodiment.

FIG. 9 shows an apparatus 100 for tagging a photograph with information. The information tagging apparatus according to the embodiment includes: an intrinsic parameter extractor 110 for extracting the intrinsic parameter; a feature vector extractor 120 for extracting a feature vector from the feature points of the reference images and the input image; a matrix and vector extractor 130 for extracting the rotation matrix and the translation vector from the intrinsic parameter and the feature vector; a calculator 140 for calculating the shooting position and direction of the input image by using the rotation matrix and the translation vector; and a tagging unit 150 for recording the position and direction information in the EXIF tag of the input image. In addition, a reference image selector for selecting two reference images by extracting visual descriptors from the database or the photo sharing server on the basis of similarities may further be included.

The intrinsic parameter can be extracted by using the focal length stored in the EXIF tag of the photograph and the CCD effective pixel number of a camera. The feature vector can be calculated by obtaining the feature point through the operation of finding matching feature points. The operation and function of the information tagging apparatus according to the embodiment are the same as the information tagging method described above.

Through repeated processes, the shooting position and direction may be stored in the EXIF tag of the photo devoid of shooting position and direction data. As a result, the information may be tagged in all the photographs requiring the position and direction tagging information.

While the exemplary embodiments have been shown and described, it will be understood by those skilled in the art that various changes in form and details may be made thereto without departing from the spirit and scope of this disclosure as defined by the appended claims.

In addition, many modifications can be made to adapt a particular situation or material to the teachings of this disclosure without departing from the essential scope thereof. Therefore, it is intended that this disclosure not be limited to the particular exemplary embodiments disclosed as the best mode contemplated for carrying out this disclosure, but that this disclosure will include all embodiments falling within the scope of the appended claims.

What is claimed is:

1. A method of tagging a photograph with information, which calculates a shooting position of an input image from reference images having shooting position information to tag the shooting position information, the method comprising:
    selecting a plurality of reference images;
    calculating a relative shooting position of the input image to shooting positions of the reference images, wherein the calculating comprising:
        calculating rotation matrices and translation vectors between the reference images and the input image;
        designating a shooting position among the reference images as a reference point in a reference coordinate system;
        rotating and translating the reference point by using the rotation matrices and the translation vectors; and
        forming a triangle by using the rotated two points and the reference point, wherein the rotation matrices and the translation vectors are a rotation matrix and a translation vector between the reference image that serves as the reference point and the input image and a rotation matrix and a translation vector between the reference images; and
    calculating the shooting position of the input image based on the calculated relative shooting position of the input image; and
    storing the shooting position and shooting direction information on the input image in an exchangeable image file format (EXIF) tag of the input image.

2. The method according to claim 1, wherein selecting the plurality of the reference images comprises selecting the plurality of the reference images from a database storing photographs, and two images of the plurality of the reference images are selected by extracting a visual descriptor of each image on the basis of similarities.

3. The method according to claim 1, wherein the input image is in a state where the EXIF tag of the input image does not include the shooting position and shooting direction information.

4. The method according to claim 1, wherein calculating the rotation matrices and the translation vectors comprises:
    extracting a feature vector of each image by obtaining the feature points between the selected reference images and the input image; and
    extracting the rotation matrices and the translation vectors by using the feature vectors.

5. The method according to claim 4, wherein the feature vector between the images is obtained by selecting a plurality of areas having predetermined sizes from each image, extracting visual descriptors from the plurality of areas, and comparing differences between histograms of the areas.

6. The method according to claim 1, wherein calculating the relative shooting position of the input image further includes obtaining the relative shooting direction of the input image from the reference coordinate system, wherein obtaining the relative shooting direction of the input image includes:
    designating one shooting position among the reference images as a reference point in a coordinate system;
    designating a reference direction at the reference point;
    rotating and translating the reference point by using the rotation matrices and the translation vectors; and
    obtaining directions of two points rotated with respect to the reference direction,
    wherein the rotation matrices are a rotation matrix between the reference image that serves as the reference point and the input image, and a rotation matrix between the reference images, and
    wherein the direction of the point rotated and translated by the rotation vector and the translation vector between the reference image that serves as the reference point and the input image is the shooting direction of the input image.

7. The method according to claim 1, wherein calculating the shooting position of the input image comprises obtaining a position of the point rotated and translated by transforming the triangle on a real map.

8. The method according to claim 6, wherein calculating the relative shooting position of the input image further includes:
    calculating the shooting direction of the input image, wherein calculating the shooting direction of the input image comprises obtaining the direction rotated by transforming the triangle on a real map.

9. The method according to claim 1, wherein selecting the reference images comprises selecting images having the same shooting position information, wherein the input image is input to a database storing photographs, and the position information is tagged on the input image stored in the database on the basis of the reference images.

* * * * *